Nov. 14, 1950 W. A. DOWNS 2,529,926

VISIBLE INDEX

Filed Aug. 8, 1944

INVENTOR.

William A. Downs

BY

F. Bascom Smith

ATTORNEY

Patented Nov. 14, 1950 2,529,926

UNITED STATES PATENT OFFICE 2,529,926

VISIBLE INDEX

William A. Downs, Hempstead, N. Y.

Application August 8, 1944, Serial No. 548,548

11 Claims. (Cl. 129—16.7)

This invention relates to visible index filing systems, and more particularly to the index data or record receiving members employed in conjunction therewith.

One object of the present invention is to provide a visible index member of novel construction which, when inserted in a visible index panel, will not override or nest with another member, whereby a selected portion of each member will always remain visible to the user.

Another object of the invention is to provide an index card or card holder for the overlapping type of vertical visible index, having novel means for mounting the same in a visible index panel and for maintaining said card or holder in proper lapped relation with an overlying and underlying card or holder.

Another object is to provide a mounting member of novel construction for association with index cards or card holders, which will loosely hold each card or holder on a visible index panel for free manipulation, and yet prevent said cards or holders from overriding or nesting together.

Another object is to provide an index card or card holder having a novel form of mounting member which will prevent overriding or nesting of the cards or holders when assembled on a visible index panel, and at the same time provide a minimum margin of visibility on each card.

A further object is to provide a member of novel, simple and inexpensive construction which may be employed as a complete visible index insert, or may be associated with an index card or card holder and serve as the means for mounting said card or holder on a visible index panel and for maintaining the same in proper lapped relation with an overlying and underlying card or holder.

A still further object is to provide a novel form of single line index for visible index filing systems.

The above and other objects and novel features of the present invention will more fully appear from the following detail description when the same is read in connection with the accompanying drawing. It is to be expressly understood, however, that the drawing is for the purpose of illustration only, and is not intended as a definition of the limits of the invention, reference for this latter purpose being had primarily to the appended claims.

In the drawing, wherein like reference characters refer to like parts throughout the several views, Fig. 1 is a top plan view of an index card holder embodying the present invention;

Figure 1:
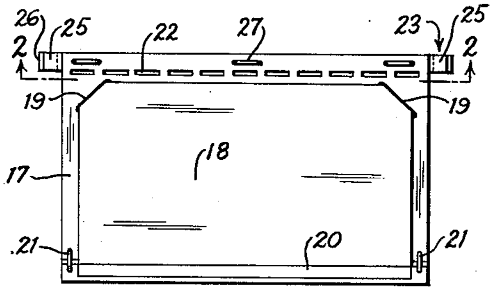
Figure 2:
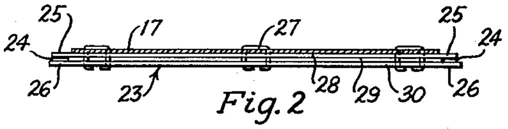
Fig. 2 is a section taken on line 2—2 of Fig. 1.

Referring first to the embodiment of the invention illustrated in Figs. 1 to 5 of the drawings, 15 (Fig. 3) indicates a panel having two inwardly turned side flanges 16, adapted to receive and slidably support, in overlapped relation, a plurality of rectangular holders 17 for index data cards 18 or the like. Each holder 17 (Fig. 1) is formed with two diagonal slots 19 to releasably receive the upper opposite corners of card 18, and is provided with a Celluloid or other transparent sheath 20 to support the lower edge of said card, said sheath being secured to said holder by staples 21. Holder 17 is further formed adjacent its upper edge with a weakening line of spaced perforations 22 providing a hinge to facilitate lifting of said holder when mounted on panel 15. It will be understood that holder 17 may itself serve as the index card in which case the slots 19 and sheath 20 are dispensed with.

Novel means are provided for mounting the holders 17 in overlapped relation on panel 15, said means preventing said holders from overriding or nesting together, thereby maintaining them in proper lapped relation so that the lower marginal edge of each card 18 carried thereby is always visible to the user. As shown, said mounting means comprise a relatively narrow elongated member 23 provided at each end and centrally between the upper and lower surfaces thereof with a slot 24 extending throughout the width of said member and forming two spaced superposed portions 25 and 26, said slot being of a size and depth slightly greater than the thickness and width of flanges 16. Member 23 is secured, as by staples 27 or the like, to holder 17 flush with the upper longitudinal edge of said holder, and said member is of a length such that the opposite ends thereof project equally beyond the side edges of the holder.

Member 23 may be formed as above described from a single piece of flexible wood or other material of a flexible nature, but, as herein shown, is preferably formed from three superposed cardboard strips 28, 29 and 30 of the same width and thickness, the intermediate strip 29 being shorter than the outer strips 28 and 30 and symmetrically arranged therebetween, thereby forming the slots 24 and providing the vertically spaced portions 25 and 26. Strips 28, 29 and 30 may be secured together by adhesive prior to stapling of the same to holder 17, or may be merely assembled in proper relation and then stapled to said holder. It will be understod that other materials may be used for strips 28, 29 and 30 as, for example, all said strips may be pliable wood, Celluloid or similar flexible material, or strips 28 and 30 may be thin sheet metal, and strip 29 may be cardboard, wood, Celluloid, or any other suitable flexible material.

Figure 3:
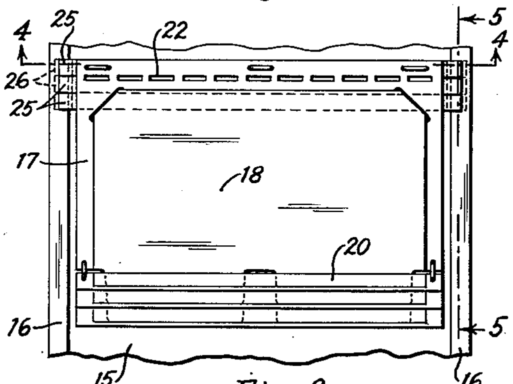
Fig. 3 is a fragmentary top plan view of a visible index panel with a plurality of holders therein.
Figure 4:
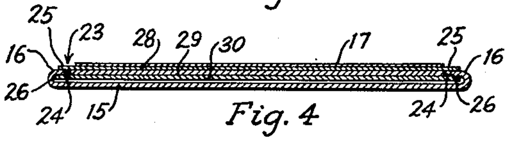
Fig. 4 is a section on the line 4—4 of Fig. 3.
Figure 5:
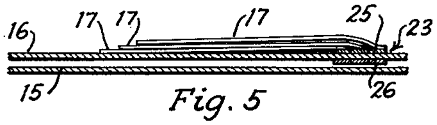
Fig. 5 is a section on the line 5—5 of Fig. 3.

In mounting holder 17 on panel 15, the portions 26 of member 23 are successively inserted or flexed beneath the flanges 16, while the portions 25 are directed over the tops of said flanges, the latter portions being slightly shorter than the portions 26 to facilitate this operation. When a plurality of holders 17 are mounted in panel 15 as described, they will be disposed in overlapped relation, and the members 23 on said holders will engage each other along their entire adjacent longitudinal edges above and below the flanges 16 (Figs. 3 and 5). In this manner, it is impossible for one holder to override another holder, and each holder will project beyond the overlying holder a minimum distance equal to the width of the member 23, thereby maintaining the lower marginal edge of each card 18 visible at all times to the user. Panel 15 is provided at the upper and lower edges thereof with stops (not shown) to hold holders 17 against endwise displacement from said panel.

In the embodiment of the invention shown in Figs. 6 to 9, inclusive, the card or holder mounting member 23 alone is utilized as a single line index member, the index data being written on the upper surface of said member. The strips 28, 29 and 30 forming member 23 are preferably made of cardboard and secured together by adhesive so that the entire upper surface of the strip 28 is free for posting of index data. These members are mounted one above the other on panel 15, and since the portions 25 and 26 of said members are disposed above and below the flanges 16 of said panel, the members will be prevented from passing each other and thus remain visible at all times to the user.

Figure 10:
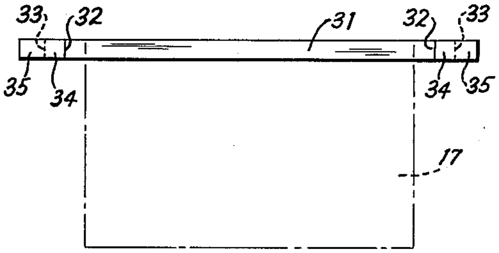
Fig. 10 is a top plan view similar to Fig. 1 illustrating the blank of a modified form of mounting member.
Figure 11:
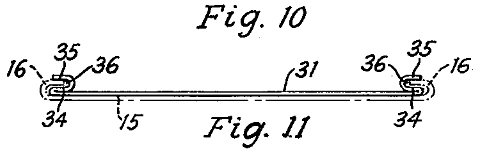
Fig. 11 is an end view of the finished mounting member inserted in a visible index panel.

Figs. 10 and 11 show a modified form of mounting member for an index card or card holder, which comprises a relatively narrow flexible strip 31 of any suitable material such as cardboard, Celluloid or metal. Strip 31 is provided on the upper and lower surfaces thereof and adjacent each end with scored or weakening lines 32 and 33, respectively, forming foldable portions 34 and 35. As shown in Fig. 11, portions 34 are folded up and back upon the body of strip 31 and preferably secured thereto by adhesive, and portions 35 are folded up and forward over portions 34 in spaced relation so that slots 36 are provided between said superposed portions. The card or card holder 17 is secured to the upper surface of strip 31 between the folded portions 34, 35, and with its upper edge flush with the upper edge of said strip. When the card or holder 17 is mounted on panel 15, the portions 34 of strip 31 are inserted or flexed beneath the flanges 16, and the portions 35 are directed over the tops of said flanges.

Figure 12:
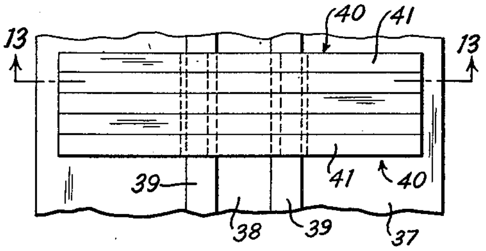
Fig. 12 is a fragmentary top plan view of another type of index panel with a plurality of single line index members therein of modified form.
Figure 6:
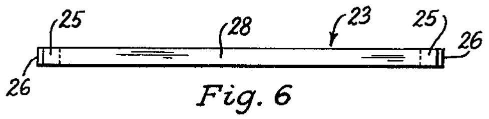
Fig. 6 is a top plan view of a single line index member constructed in accordance with the present invention.
Figure 7:
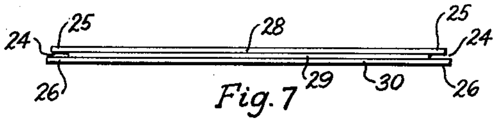
Fig. 7 is a side elevation of the member shown in Fig. 6.
Figure 8:
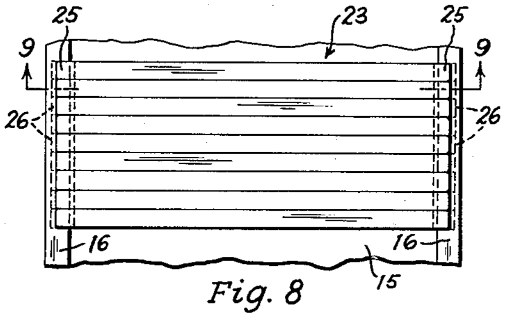
Fig. 8 is a fragmentary top plan view of a visible index panel with a plurality of single line index members therein.
Figure 9:
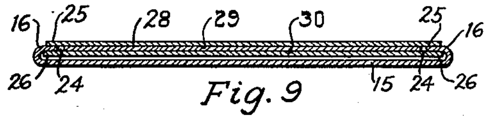
Fig. 9 is a sectional view on the line 9—9 of Fig. 8.
Figure 13:
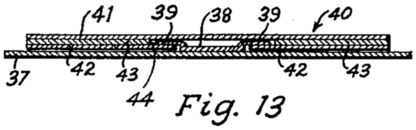
Fig. 13 is a sectional view on the line 13—13 of Fig. 12.

Figs. 12 and 13 show a modified form of single line index member constructed for mounting on a panel 37 having a centrally disposed elongated plate 38 secured to the upper surface of said panel and formed to provide two outwardly facing parallel flanges 39. This index member, indicated generally at 40, comprises a relatively narrow elongated upper strip 41, two short lower strips 42, and two short intermediate strips 43, the strips 42, 43 being the same width and thickness as the strip 41, and all said strips being preferably made of cardboard. Strips 42 and 43 are of a length such that when assembled with strip 41 and with their outer ends in line with the ends of said strip, the inner ends of strip 42 will be spaced apart a distance slightly greater than the width of the base portion of plate 38, and the inner ends of strip 43 will be spaced apart a distance slightly greater than the distance between the outer edges of the parallel flanges 39, thus forming in member 40 a slot 44, T-shaped in longitudinal cross section to receive flanges 39 and base portion of plate 38.

Strips 41, 42 and 43 are preferably secured together by adhesive to provide a free upper surface on strip 41 for the index data or material. In mounting the member 40 on panel 37, the inwardly projecting ends of strips 42 are inserted or flexed beneath the flanges 39, whereupon the strip 41 will extend across the top of said flanges. In this manner the members 40 are slidably held on panel 37 one above the other, and positively prevented from passing each other, thereby maintaining said members visible at all times to the user.

There is thus provided a mounting member of novel, simple and inexpensive construction for index cards or card holders which will prevent said cards or holders from overriding or nesting together when mounted in overlapped relation on a visible index panel, thereby maintaining the index data visible at all times to the user, and at the same time permits removal or insertion of a card or holder without disturbing the remaining cards or holders on said panel. The mounting member alone provides a novel single line index member which can be mounted on an existing visible index panel and used with utmost reliability because said member will always remain in position and visible to the user. There is also provided a single line index member of novel construction for central mounting on an existing type of visible index panel, which will also always remain in position and visible to the user.

The compactness of the visible index disclosed is highly important because it assures an index system of large capacity in a relatively small space. The single line index member results in a particularly compact system. While panel 15 and flanges 16 referred to above may be formed of metal, it will be understood that the novel construction of member 23 permits flanges 16 and the panel 15, if necessary, to be made of relatively non-rigid material such as cardboard or tough paper, and if desired said flanges can be positioned, as by glueing or pasting, to holders 17, or even formed integrally with said holders, to receive a plurality of single line index members and thus provide a visible index within a visible index. It will also be understood that the intermediate strip 29 may in certain instances be eliminated, and in this event members 28 and 30 will be secured together, as by a suitable adhesive, throughout the greater part of their length, but the end portions thereof will not be joined so that the superposed portions 25 and 26 may engage the opposite faces of flanges 16. It will be further understood that when the intermediate strip 29 is eliminated, the members 28 and 30 may be made from a single piece of material folded to form said members and slit at opposite ends so that the end portion may engage the opposite faces of flanges 16. When members 28 and 30 are so made and used as a mounting member for an index card or holder, they may be formed integrally with said card or holder. Various other changes may be made in the devices shown, as will be readily apparent to those skilled in the art. It will accordingly be understood that the invention is not limited to the structures illustrated and that reference will be had to the appended claims for a definition of the limits of the invention.

What is claimed is:

1. In a visible index device having a panel provided with spaced outwardly facing parallel flanges disposed centrally thereon, the combination with said panel of means for receiving index data adapted to be slidably mounted on said panel and comprising an elongated member having a centrally disposed slot therein for receiving said flanges and extending throughout the width of said member approximately midway between the upper and lower surfaces thereof, said slot being T-shaped in longitudinal cross section and opening through the lower surface of said member.

2. An article of manufacture for use in a visible index device comprising a rectangular index data receiving member, and a relatively narrow elongated mounted member secured to said index member adjacent the upper edge thereof and extending beyond each side edge of said index member, said mounting member having a slot in each end thereof and extending throughout the width of said member approximately midway between the upper and lower surfaces thereof.

3. A visible index unit comprising a rectangular data receiving member, and a relatively narrow elongated mounting member secured to said data member adjacent the upper edge thereof and extending beyond each side edge of said data member, said mounting member comprising three superposed strips, the intermediate strip being relatively shorter than the upper and lower strips and arranged symmetrically between the same.

4. An article of manufacture for use in a visible index device comprising a rectangular index data receiving member, and a relatively narrow elongated mounting member secured to said index member adjacent the upper edge thereof and extending beyond each side edge of said index member, said mounting member comprising three symmetrically arranged superposed strips, the intermediate strip being shorter than the upper and lower strips to form mounting slots, and the upper strip being shorter than the lower strip.

5. A visible index unit comprising a rectangular holder for an index card or the like, and a relatively narrow elongated mounting member secured to said holder adjacent the upper edge thereof and extending laterally beyond each side edge of said holder, said mounting member comprising three symmetrically arranged superposed cardboard strips of the same width and thickness, the intermediate strip being shorter than the upper and lower strips to form slots at the opposite ends of said strips and the upper strip being somewhat shorter than the lower strip.

6. A visible index member comprising a narrow elongated flexible strip, a pair of strips disposed beneath said first-named strip in line with each end of the latter and extending part way therealong, and a pair of strips disposed beneath said second-named strips in line with the outer ends of the latter and projecting beyond the inner ends of said second-named strips, the length of said last-named pair of strips combined being less than the length of said first-named strip, and all said strips being secured together.

7. In a visible index of the type embodying a panel having spaced inwardly directed parallel flanges, the combination with said panel of a series of narrow elongated visible index members cooperating with said flanges and slidably mounted on said panel in non-overlapping relation, each of said members being of a uniform thickness from end to end and having in each end thereof a slot of a size and depth slightly greater than the thickness and width of said flanges to freely receive the latter therein, and each of said members being formed of card stock, whereby index data can be posted on a plane surface thereof and each member can be flexed to endwise engage it with and disengage it from said flanges.

8. An article of manufacture for use selectively as an index member or as an index card mounting member in a visible index device embodying a panel having spaced inwardly directed parallel flanges, comprising a narrow elongated strip of card stock of a uniform thickness from end to end adapted to be engaged with said flanges, and having in each end thereof a slot which is of a size and depth slightly greater than the thickness and width of said flanges to freely receive the latter therein.

9. An article of manufacture for use selectively as an index member or as an index card mounting member in a visible index device embodying a panel having spaced inwardly directed parallel flanges, comprising three superposed strips of the same width secured together and formed of card stock, the length of the upper and lower strips being greater than the distance between the opposed free inner ends of said panel flanges, and the length of the intermediate strip being slightly less than said distance, said intermediate strip being symmetrically arranged between said upper and lower strips and being of a thickness not less than the thickness of said panel flanges.

10. An article of manufacture for use selectively as an index member or as an index card mounting member in a visible index device embodying a panel having inwardly turned flanges at opposite sides thereof, comprising three symmetrically arranged superposed strips of the same width and of different lengths secured together and formed of card stock, the length of the lower strip being slightly less than the width of said panel minus twice the thickness thereof, the length of the upper strip being less than said lower strip and greater than the distance between the opposed free inner ends of said flanges, the length of the intermediate strip being slightly less than said distance, and the thickness of said intermediate strip being slightly greater than the thickness of said flanges.

11. In a visible index of the type embodying a panel having spaced parallel flanges, the combination with said panel of a series of narrow elongated members cooperating with said flanges and slidably mounted on said panel in non-overlapping relation, each of said members being of a uniform thickness from end to end and having slots therein intermediate and parallel with the front and back plane surfaces of the member, said slots being of a size and depth slightly greater than the thickness and width of said flanges to freely receive the latter therein, and each of said members being formed of card stock, whereby index data can be posted directly on the said front plane surface thereof and each member can be flexed to engage it with and disengage it from said flanges.

WILLIAM A. DOWNS.

REFERENCES CITED

The following references are of record in the file of this patent:

UNITED STATES PATENTS

| Number | Name | Date |
|---|---|---|
| 1,183,370 | Garfield | May 16, 1916 |
| 1,227,665 | Rand | May 29, 1917 |
| 1,418,467 | Rand | June 6, 1922 |
| 1,583,437 | Auerbach | May 4, 1926 |
| 1,678,541 | Von Auw | July 24, 1928 |
| 1,698,329 | Garfield | Jan. 8, 1929 |
| 1,729,908 | Wood | Oct. 1, 1929 |
| 1,756,853 | Day | Apr. 29, 1930 |
| 1,923,366 | Garfield | Aug. 22, 1933 |

FOREIGN PATENTS

| Number | Country | Date |
|---|---|---|
| 169,059 | Switzerland | 1934 |
| 233,049 | Great Britain | 1925 |
| 458,186 | Germany | 1928 |
| 466,949 | Germany | 1928 |